Patented July 10, 1934

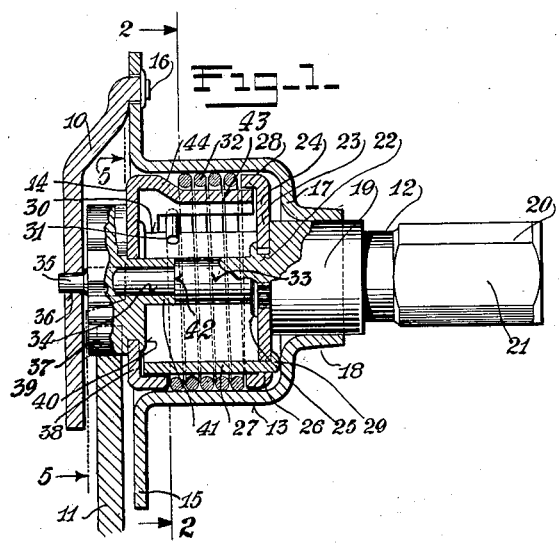
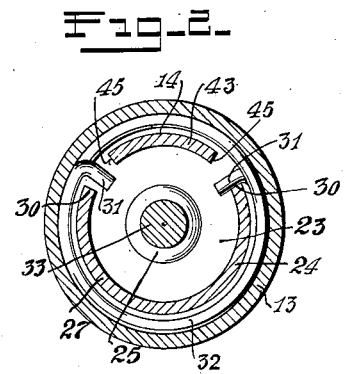
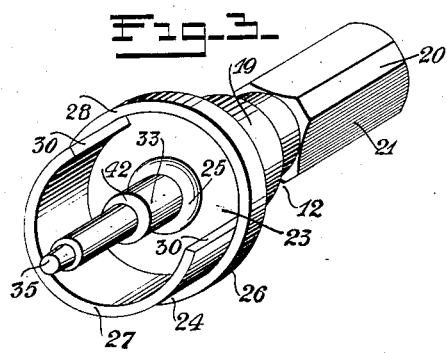
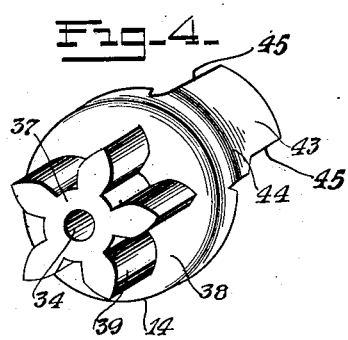
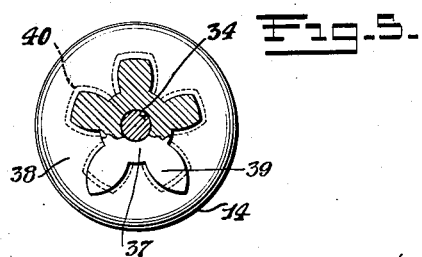

1,965,878

UNITED STATES PATENT OFFICE 1,965,878

CLUTCH MECHANISM

Stephen F. Briggs, Milwaukee, Wis., assignor to Briggs & Stratton Corporation, Milwaukee, Wis., a corporation of Delaware Application March 1, 1928, Serial No. 258,233

12 Claims. (Cl. 192—8)

This invention relates to certain new and useful improvements in clutch mechanisms especially designed for use with window regulators of the type employed in closed vehicles and has as an object the provision of an improved and simplified structure having bearings at its opposite ends to maintain the device true and prevent undue wear and breakage by the placing of extraordinary and uneven stresses on the parts thereof.

A more specific object of this invention resides in the provision of an improved clutch mechanism of the character described having a drive member provided with a large bearing juxtaposed the point where the driving stress is applied thereto and having an elongated arbor projected through the driven member to provide a journal at its extreme outer end whereby the clutch mechanism is journaled at two widely separated points of a single shaft to prevent uneven wear on the bearings and the consequent interference with the true operation of the device.

And a still further object of this invention resides in the provision of an improved clutch mechanism of simplified construction whereby a better and more durable device is produced without increase in manufacturing costs.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, I have illustrated one complete example of the physical embodiment of my invention constructed according to the best mode I have so far devised for the practical application of the principles thereof, and in which:

Figure 1 is a detail view, with parts in side elevation and parts in section, of an improved clutch mechanism embodying my invention;

Figure 2 is a transverse, sectional view taken therethrough on the plane of the line 2—2 of Figure 1;

Figure 3 is a perspective view of the driven member of the clutch mechanism;

Figure 4 is a perspective view of the drive member of the clutch mechanism, and

Figure 5 is a transverse, sectional view taken through Figure 1 on the plane of the line 5—5.

Referring now more particularly to the accompanying drawing, in which like numerals designate like parts throughout the several views, 10 designates the mounting bracket of a window regulator, which may be of the character illustrated in United States Letters Patent No. 1,609,-281, issued Andrew C. Andersen, December 7, 1926. The regular structure is but partly shown in the drawing and, as customary, is adapted to be suitably mounted from the lock board or transverse brace, not shown, of a vehicle door frame, not shown, the segmental gear 11 of the regulator operating a lever or other window control device, not shown, pivotally supported from the bracket. Inasmuch as the window regulator per se forms no part of the present invention, it has not been shown in detail and for better understanding of the structure thereof reference may be had to the Letters Patent above referred to.

The clutch mechanism consists of a driving member 12 adapted to be operatively connected with a substantially cup shaped casing forming a brake housing 13, there being a brake mechanism located within the housing to cooperate with the driving member and a driven member 14 to permit unrestricted operation of the device when rotational stress is applied to the driving member, and to oppose operation of the device when rotational stress is applied to the driven member as by placing a strain on the window, not shown. In the present embodiment, the brake housing is preferably stamped from one piece and is of substantially cup shape with its outer peripheral rim laterally flanged, as at 15, and riveted or otherwise secured to the bracket 10, as at 16.

The closed end 17 of the brake housing has a central opening therein from which a sleeve or bearing portion 18 extends to receive the journal 19 of the driving member shaft 20, on the outer squared end 21 of which a suitable window operating handle or crank, not shown, is adapted to be fastened. The shaft 20 is reduced in diameter inwardly of its journaled portion 19, as at 22, and has teeth broached thereon to interlock with the teeth at the periphery of the central aperture of the closed wall 23 of a drum member 24 pressed on the reduced portion 22 and there secured by swedging the metal of the shaft 20 thereover, as at 25. The drum 24, in the present instance, is formed of two parts 26 and 27, part 26 forming the closed wall 24 of the drum and having an inwardly directed annular flange 28 within which the part 27 is confined and secured by projections on its inner end extended through the wall 24 and struck thereover, as at 29. The part 27 forms a cylinder having a part of its wall cut away or slotted so that the longitudinal edges 30 thereof form stops or abutments over which extend the inturned ends 31 of a spring 32 coiled about the drum, as best shown in Figures 1 and 2.

An arbor 33 extends from the inner end of the shaft 20 and is reduced in diameter from a point spaced inwardly of the brake drum end wall 24 to extend through the central bore 34 of the driven member 14, the extreme outer end 35 of the arbor projecting beyond the driven member and being journaled in an opening 36 in the bracket member 10 so that the mechanism has two widely separated bearings carried by a rigid shaft, one located at the journal 19 and the other at the end 35.

The driven member is preferably formed in two parts, a spur gear or pinion 37 and a shallow cup member 38 secured thereto by having its teeth 39 reduced in diameter at their inner ends and forced into complementary openings in the wall of the cup member and swedged thereover, as at 40, to form a rigid connection between the cup member and spur gear, there being a bearing portion 41 rigid with the gear and extended inwardly beyond the cup shaped member to abut the shoulder 42 of the arbor 33 and limit the movement of the driven member on the arbor 33. The washer 38 is of substantially the same diameter as the washer or cup 28 of the driven member to form side flanges for the drum 27 between which the spring 32 is confined, a driving lug or projection 43 being extended from the cup 38 of the driven member to partly fill the space between the abutments 30 of the drum 27. The projection or lug 43 is struck inwardly and then laterally, as at 44, so that the major portion of its body is on the same diameter as the drum 27 and forms substantially a continuation of its circumference, the inturned ends 31 of the spring 32 being disposed between the abutments 30 and the sides 45 of the projection 43.

It will be thus apparent that with the driving and driven members disposed within the brake housing they form a spool shaped drum about which the spring 32 is coiled, thus holding the spring against exerting an end thrust on a stationary part while the device is being operated. The spring 32 is normally compressed with its inturned ends 31 closer than the space between the abutments 30 so that its periphery normally frictionally contacts with the brake housing wall and a rotational stress applied to the driving member engages the abutment 30 leading the direction of rotation with the adjacent spring inturned end 31 and which in turn engages the adjacent edge 45 of the projection 43, tending to coil the spring tighter about the drum 27 and decrease its frictional contact of the wall of the housing and permit unrestricted rotation of the driving member and consequently the driven member to manipulate the segmental gear 11, and the window, not shown, connected therewith. A rotational stress applied to the driven member, as by a downward jarring of the window, not shown, or an attempt to open the window by exertion of a downward stress thereon, causes the edge 45 of the projection 43 leading the direction of rotation to engage the adjacent inturned end 31 of the spring and tend to spread the spring ends increasing its frictional contact with the brake housing and firmly locking the mechanism against operation.

From the foregoing description, taken in connection with the accompanying drawing, it will be readily apparent to those skilled in the art to which an invention of the character described apertains, that I have provided an improved clutch mechanism especially designed for use in connection with window regulators and automotive vehicles wherein but a few parts are necessary which are so balanced and journaled as to guide the gear to run true with respect to the segmental gear at all times and to prevent all end play.

What I claim as my invention is:

1. In a clutch mechanism of the character described, a normally stationary housing, a rotatable driving member located within the housing and including a shaft having its ends extended beyond the ends of the housing, a driven member freely journaled on one end portion of said driving member shaft and having a portion located within the housing, a support to which the stationary housing is secured, a bearing carried by the support and receiving the adjacent end of the shaft, a bearing for the shaft carried by the end of the housing opposite the support whereby the shaft is journaled at two widely separated points, and a drive connection between said members and located within the housing.

2. In a clutch mechanism of the character described, a normally stationary housing, a rotatable driving member located within the housing and including a shaft having its ends extended beyond the ends of the housing, a driven member freely journaled on one end portion of said driving member shaft and having a portion located within the housing, a support to which the stationary housing is secured, a bearing carried by the support and receiving the adjacent end of the shaft, a bearing for the shaft carried by the end of the housing opposite the support whereby the shaft is journaled at two widely separated points, and a drive connection between said members and located within the housing and including a brake mechanism for resisting rotational stress applied to the driven member but permitting free rotation of the members when rotational stress is applied to the driving member.

3. In a clutch mechanism of the character described, a normally stationary housing, a rotatable driving member located within the housing and including a shaft having its ends extended beyond the ends of the housing, a driven member freely journaled on one end portion of the driving member shaft and having a portion located within the housing, a support to which the stationary housing is secured, a bearing carried by the support and receiving one end of the shaft, a bearing for the other end portion of the shaft carried by the end of the housing opposite the support whereby the shaft is journaled at two widely separated points, a drive connection between said members and located within the housing, and cooperating shoulders carried by the driven member and said shaft to restrict side play between the members.

4. In a clutch mechanism of the character described, a member including a pinion gear having the inner end portions of its teeth reduced in diameter, and a flange having a central opening of a shape complementary to the reduced portion of the gear into which the gear reduced portion is adapted to be engaged.

5. In a clutch mechanism of the character described, a member including a pinion gear having the inner end portions of its teeth reduced in diameter, a flange having a central opening of a shape complementary to the reduced portion of the gear into which the gear reduced portion is adapted to be engaged, and a part integral with the gear swedged over the inner surface of the flange to make the gear fast thereto.

6. In a clutch mechanism of the character described, a driving member, a driven member including a pinion gear, means drivingly connecting said members, the inner end of said pinion gear being of a reduced diameter, and a flange having a central opening of a shape complementary to the reduced end of the pinion gear and in which the pinion gear reduced end is made fast.

7. In a clutch mechanism of the character described including a driven member consisting of a pinion gear having its inner ends of a reduced diameter, and a flange member having a central opening complementary to the reduced end of the pinion gear and into which said pinion gear reduced end is pressed.

8. In a clutch mechanism of the character described including a driven member consisting of a pinion gear having its inner ends of a reduced diameter; a flange member having a central opening complementary to the reduced end of the pinion gear and into which said pinion gear reduced end is pressed, and a flange integral with the pinion gear and swedged over the inner surface of said flange member to make the flange member and pinion gear rigid with respect to each other.

9. In a clutch mechanism of the character described, a driving member including a shaft, teeth formed in the shaft, there being a shoulder at one end of the teeth, a flange member having a central opening complementary to the teeth of the shaft and into which the toothed portion of the shaft is engaged with the shoulder abutting the same, a flange engaging the surface of the face of the flange member opposite said shoulder to prevent the dislodgement of the flange member from the shaft, said part being formed by swedging that portion of the intermediate diameter of the shaft projected beyond the flange member, a drum member, and projections on the inner edge of the drum member passed through complementary openings of the flange member and swedged thereover.

10. In a window regulator mechanism, the combination with a support having spaced bearing portions, of a driving member extending across the space between said bearing portions and journalled therein, a driven member journalled upon part of said driving member between the spaced bearing portions, and means cooperating with said driving and driven members to effect locking when driving effort is exerted from one member and to permit turning when driving effort is exerted from the other member.

11. In a window regulator mechanism, the combination with spaced stationary bearings, of a driving member having spaced portions journalled in said bearings, a driven member journalled upon the driving member between the bearings, and means cooperating with said driving and driven members to effect locking when driving effort is exerted from one member and to permit turning when driving effort is exerted through the other member.

12. In a window regulator mechanism, the combination with a support having spaced bearing portions, a cylindrical housing intermediate the bearings, a driving member having spaced portions journalled in the bearings, a driven member journalled on the driving member between said bearings, and a coiled spring cooperating with the driving and driven members and the cylindrical housing for preventing turning of said members when driving effort is exerted from the driven member.

STEPHEN F. BRIGGS.